(12) United States Patent
Emtman et al.

(10) Patent No.: US 8,931,185 B2
(45) Date of Patent: Jan. 13, 2015

(54) ELECTRONIC CALIPER CONFIGURED TO GENERATE POWER FOR MEASUREMENT OPERATIONS

(71) Applicant: Mitutoyo Corporation, Kawasaki-shi, Kanagawa-ken (JP)

(72) Inventors: Casey Emtman, Kirkland, WA (US); Michael Nahum, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 188 days.

(21) Appl. No.: 13/705,085

(22) Filed: Dec. 4, 2012

(65) Prior Publication Data

US 2014/0150274 A1 Jun. 5, 2014

(51) Int. Cl.
*G01B 3/24* (2006.01)
*G01B 3/00* (2006.01)
*G01B 3/20* (2006.01)

(52) U.S. Cl.
CPC ............... *G01B 3/002* (2013.01); *G01B 3/205* (2013.01)
USPC ............................................. 33/784; 33/810

(58) Field of Classification Search
USPC ............................ 33/783, 784, 810, 811, 812
See application file for complete search history.

(56) References Cited

U.S. PATENT DOCUMENTS

| | | | |
|---|---|---|---|
| 3,742,609 A * | 7/1973 | Jeannet et al. ................... | 33/810 |
| 4,573,270 A * | 3/1986 | D'Amico ......................... | 33/783 |
| 4,644,660 A * | 2/1987 | Mathes ............................ | 33/810 |
| 4,963,811 A | 10/1990 | Weber | |
| 5,102,471 A | 4/1992 | Sasaki | |
| 5,229,738 A | 7/1993 | Knapen | |
| 5,574,381 A | 11/1996 | Andermo | |
| 5,901,458 A | 5/1999 | Andermo | |
| 5,923,619 A | 7/1999 | Knapen | |
| 5,973,494 A | 10/1999 | Masreliez | |
| 6,124,649 A | 9/2000 | Schafroth | |
| 6,279,248 B1 * | 8/2001 | Walters ......................... | 33/1 PT |
| RE37,490 E | 1/2002 | Andermo | |
| 6,400,138 B1 | 6/2002 | Andermo | |
| 6,834,439 B2 * | 12/2004 | Matsumiya et al. ............ | 33/706 |
| 7,533,474 B2 | 5/2009 | Saito | |
| 2002/0047333 A1 | 4/2002 | You | |
| 2003/0047009 A1 * | 3/2003 | Webb .............................. | 33/512 |
| 2003/0217478 A1 * | 11/2003 | Matsumiya et al. ............ | 33/784 |
| 2007/0068027 A1 * | 3/2007 | Suzuki ............................ | 33/784 |
| 2008/0057895 A1 | 3/2008 | Hsu | |
| 2010/0046180 A1 | 2/2010 | Zhou | |
| 2013/0269199 A1 * | 10/2013 | Biselx ............................. | 33/810 |
| 2014/0150272 A1 * | 6/2014 | Emtman et al. ............ | 33/558.04 |

OTHER PUBLICATIONS

Maurath, D., et al., "Highly Efficient Integrated Rectifier and Voltage Boosting Circuits for Energy Harvesting Applications," Advances in Radio Science 6:219-225, 2008.

* cited by examiner

*Primary Examiner* — G. Bradley Bennett
(74) *Attorney, Agent, or Firm* — Christensen O'Connor Johnson Kindness PLLC (57) ABSTRACT

An electronic caliper generates power for measurement operations. The caliper comprises a scale member, a slider, a signal processing portion configured to measure a displacement between the scale member and slider, a power generating arrangement attached to the slider comprising a gear assembly configured to rotate in response to a force provided through the scale member to the gear assembly by a user opening or closing the caliper, and a power generator coupled to the gear assembly and configured to rotate in response to force provided by the rotating gear assembly and provide power to the signal processing portion. The power generating arrangement generates power as the user opens or closes the caliper and is configured such that it contributes a motion resistance force component of at most 20N during the user opening or closing the caliper using a maximum manual acceleration and/or speed.

15 Claims, 5 Drawing Sheets

ELECTRONIC CALIPER CONFIGURED TO GENERATE POWER FOR MEASUREMENT OPERATIONS

FIELD

The present application relates generally to metrology systems, and more particularly to an electronic caliper which is capable of generating power from standard motions required for its use.

BACKGROUND

Various electronic calipers are known that use electronic position encoders. These encoders are generally based on low-power inductive, capacitive, or magnetic position sensing technology. In general, an encoder may comprise a readhead and a scale. The readhead may generally comprise a readhead sensor and readhead electronics. The readhead outputs signals that vary as a function of the position of the readhead sensor relative to the scale, along a measuring axis. In an electronic caliper, the scale is generally affixed to an elongated scale member that includes a first measuring jaw and the readhead is affixed to a slider which is movable along the scale member and which includes a second measuring jaw. Thus, measurements of the distance between the two measuring jaws may be determined based on the signals from the readhead.

Exemplary electronic calipers are disclosed in commonly assigned U.S. Pat. No. RE37490, U.S. Pat. Nos. 5,574,381, and 5,973,494, each of which is hereby incorporated by reference in its entirety. Caliper technology emphasizes the need for lower power consumption, for example, U.S. Pat. No. 5,973,494 discloses configurations which reduce power consumption in a caliper. Nonetheless, even in low power configurations, batteries need replacement periodically. This is seen by some users as an unwanted inconvenience and/or expense. A caliper which eliminates battery replacement, or significantly postpones replacement, is desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

When generating power to eliminate or postpone the need for battery replacement in a caliper, users may not want to compromise existing desirable aspects of caliper operation. Therefore, in various embodiments, it would be desirable and most convenient if power generation in the caliper results from standard motions required for caliper use. Furthermore, it would be desirable if the feel of the standard motions is relatively unchanged in comparison to existing calipers. For example, it may be desirable for the force required to open and close the jaws to remain relatively low, so the user experiences the caliper with the feel of a precision instrument, and may also exert fine control over workpiece contact forces in order to prevent workpiece deformation and obtain more repeatable measurements.

An electrically powered caliper configured to generate power for measurement signal processing operations is disclosed which comprises: a scale member; a slider; a signal processing portion configured to measure a displacement between the scale member and the slider; a power generating arrangement attached to the slider comprising a gear assembly configured to rotate in response to a force provided through the scale member to the gear assembly by a user opening or closing the caliper; and a power generator coupled to the gear assembly and configured to rotate in response to force provided by the rotating gear assembly and provide power to the signal processing portion.

The power generating arrangement generates power as the user opens or closes the caliper. In various embodiments, the power generating arrangement is configured such that it contributes a motion resistance force component of at most 20N, or 10N in other embodiments, or less, during which the user opens or closes the caliper using a maximum manual acceleration or less. In various embodiments, the power generating arrangement is configured such that it contributes a motion resistance force component of at most 20N, or 10N in other embodiments, or less, during which the user opens or closes the caliper using a maximum manual speed or less. The motion resistance force component may comprise an inertia component and a generator work component. The motion resistance force component contributed by the power generating arrangement may be measured by determining a difference in the motion resistance force of the slider assembly with the power generating arrangement engaged such that it is driven by moving the slider, and the motion resistance force of the slider assembly with the power generating arrangement disengaged such that the slider motion does not drive any elements of the power generating arrangement. The maximum manual acceleration and speed refer to the maximum accelerations and speeds that may be expected to be achievable by typical caliper users when opening and closing the calipers.

In some embodiments, the gear assembly comprises an input element of a smaller diameter that is coupled to an outer gear of a larger diameter that drives an inner gear of a smaller diameter which is coupled to another outer gear of a larger diameter that drives the generator through one or more additional gears. In some embodiments, the input element is a smaller or inner gear that is driven by a rack attached to the scale member. In some embodiments, the input element is a smaller friction roller that is driven by an edge of the scale member. In some embodiments, the friction roller comprises a wedge-shaped recess which engages the edge of the scale member. In some embodiments, the caliper comprises a spring element which presses the friction roller against the scale member. In some embodiments, the spring element is movable by a user and is configured to press the friction roller against the edge of the scale member in a first position corresponding to an active power generation state, and to not press the friction roller against the edge of the scale member in a second position corresponding to an inactive state when power generation is not intended.

In some embodiments, the gear assembly comprises a force-limiting clutch which is configured to limit the motion resistance force component. In some embodiments, the force-limiting clutch is located between an input element of the gear assembly and a gear coupled to the input element by the force-limiting clutch.

In some embodiments, the signal processing portion comprises an energy storage element comprising at least one of a battery and a capacitor to store energy generated by the power generating arrangement.

In some embodiments, the gear assembly comprises gears with a diametral pitch which is at least 120.

In some embodiments, at least some gears of the power generating arrangement are located in a volume between the top of the scale member and the inside of a cover which encloses the signal processing portion.

In some embodiments, at least some gears of the power generating arrangement are located in a volume between the bottom of the scale member and an inside surface of a portion of the slider that wraps around the bottom of the scale member.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
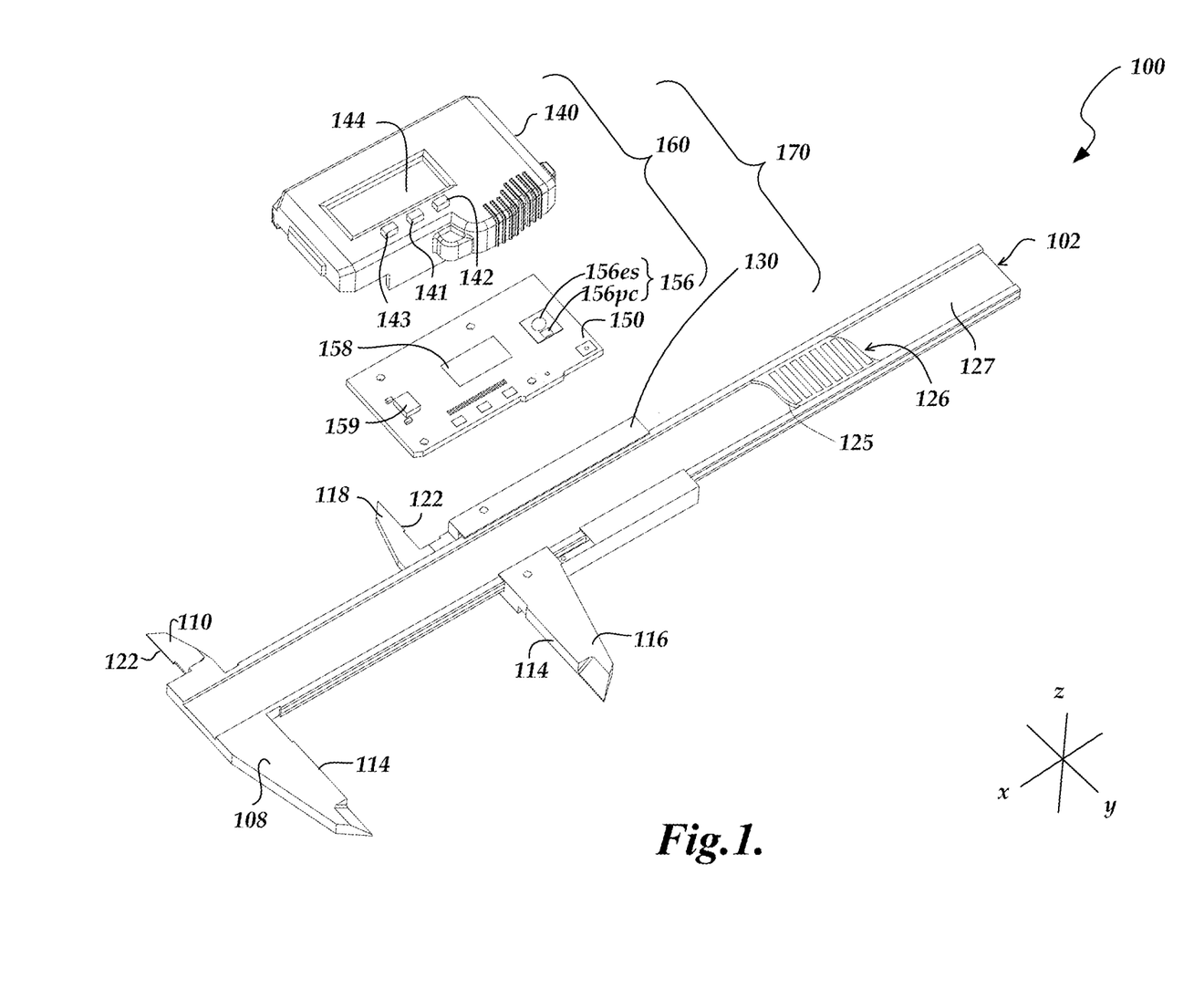
FIG. 1 is an exploded view diagram of a hand tool type caliper which may be adapted to the principles disclosed herein.

FIG. 1 is an exploded view diagram of one embodiment of a hand tool type caliper 100 which may be adapted to the principles disclosed herein to generate power. In this example, the caliper 100 comprises a magnetic or inductive sensor assembly 158 and a scale substrate 125 including a scale track 126 (a cut-away segment of each is illustrated) that is positioned in a groove 127 along an elongated scale member 102. A slider assembly 170 includes an electronic assembly 160 attached to a slider 130. The magnetic or inductive sensor assembly 158 is included in the electronic assembly 160.

The general mechanical structure and physical operation of the caliper 100 is similar to that of certain prior electronic calipers, such as that of commonly assigned U.S. Pat. No. 5,901,458, which is hereby incorporated by reference in its entirety. The scale member 102 is a rigid or semi-rigid bar which may include various grooves and/or other features incorporated into a generally rectangular cross section. The scale substrate 125 may be rigidly bonded in the groove 127, and the scale track 126 may include scale elements that cooperate with corresponding elements (not shown) of the sensor assembly 158 included in electronic assembly 160, in a manner similar to that used in known electronic calipers and as described in previously incorporated U.S. Pat. Nos. RE37490 and U.S. Pat. No. 5,901,458, and commonly assigned U.S. Pat. No. 6,400,138, which is incorporated herein by reference in its entirety.

A pair of jaws 108 and 110 are integrally formed near a first end of the scale member 102. A corresponding pair of jaws 116 and 118 are formed on the slider 130. The outside dimensions of a workpiece are measured by placing the workpiece between a pair of engagement surfaces 114 of the jaws 108 and 116. Similarly, the inside dimensions of a workpiece are measured by placing a pair of engagement surfaces 122 of the jaws 110 and 118 against opposing internal surfaces of the workpiece. In a position sometimes referenced as the zero position, the engagement surfaces 114 abut one another, the engagement surfaces 122 are aligned, and both the outside and inside dimensions measured by the caliper 100 may be indicated as zero.

The measured dimension may be displayed on a digital display 144 that is mounted within a cover 140 of the electronic assembly 160 of the caliper 100. The electronic assembly 160 may also include a set of push button switches 143, 141, and 142 (e.g., an on/off switch, mode switch, and zero set switch), and a signal processing and display circuit board 150 comprising a readhead signal processing and control circuit 159. In one embodiment shown in FIG. 1, the bottom surface of the signal processing and display circuit board 150 is mounted to abut the top surfaces of the slider 130 on either side of the scale member 102.

Some calipers similar to the type shown in FIG. 1 are powered by one or more batteries that connect to the electronic assembly 160. It is also known to power similar calipers with solar cells, for example as taught in U.S. Pat. No. 4,963,811 (hereafter the '811 Patent), which is hereby incorporated by reference in its entirety. The '811 Patent teaches a power management system including a solar collector, a storage device (e.g., a storage capacitor), and a power control circuit. If the solar collector provides more power than required for operating the caliper, the power control circuit may connect the solar collector to the storage device to store reserve energy. The caliper may at times be operated exclusively on the stored energy.

For the purposes of this disclosure, the electronic assembly 160 may comprise a power management portion 156 analogous to that of the '811 Patent. The power management portion 156 includes an energy storage device 156es and a power conditioning and control circuit 156pc. The energy storage device 156es may be a battery or a capacitor, for example, which stores energy for operating the caliper 100. The power conditioning and control circuit 156pc may provide power and energy management functions analogous to those outlined above and/or in the '811 Patent, in order to store and use energy generated as disclosed herein, which may be provided in the form of an alternating current or voltage. Therefore, the power conditioning and control circuit 156pc may also include a boost and rectification circuit that boosts and rectifies AC voltage from the power generator shown in later figures, such that it may be stored by the energy storage device 156es and used to operate the caliper 100. For example, one applicable boost and rectification circuit is described in the article "Highly efficient integrated rectifier and voltage boosting circuits for energy harvesting applications," *Adv. Radio Sci.*, 6:219-225, 2008, incorporated by reference herein. In some embodiments, some or all of the power conditioning and control circuit 156pc may be merged with and/or indistinguishable from the signal processing and control circuit 159

It should be appreciated that while a magnetic or inductive caliper is described above, an electronic caliper using any sensor type may be adapted to the principles described with reference to FIGS. 2-5. For example, a caliper using capacitive sensing technology may utilize features described in FIGS. 2-5.

Figure 2:
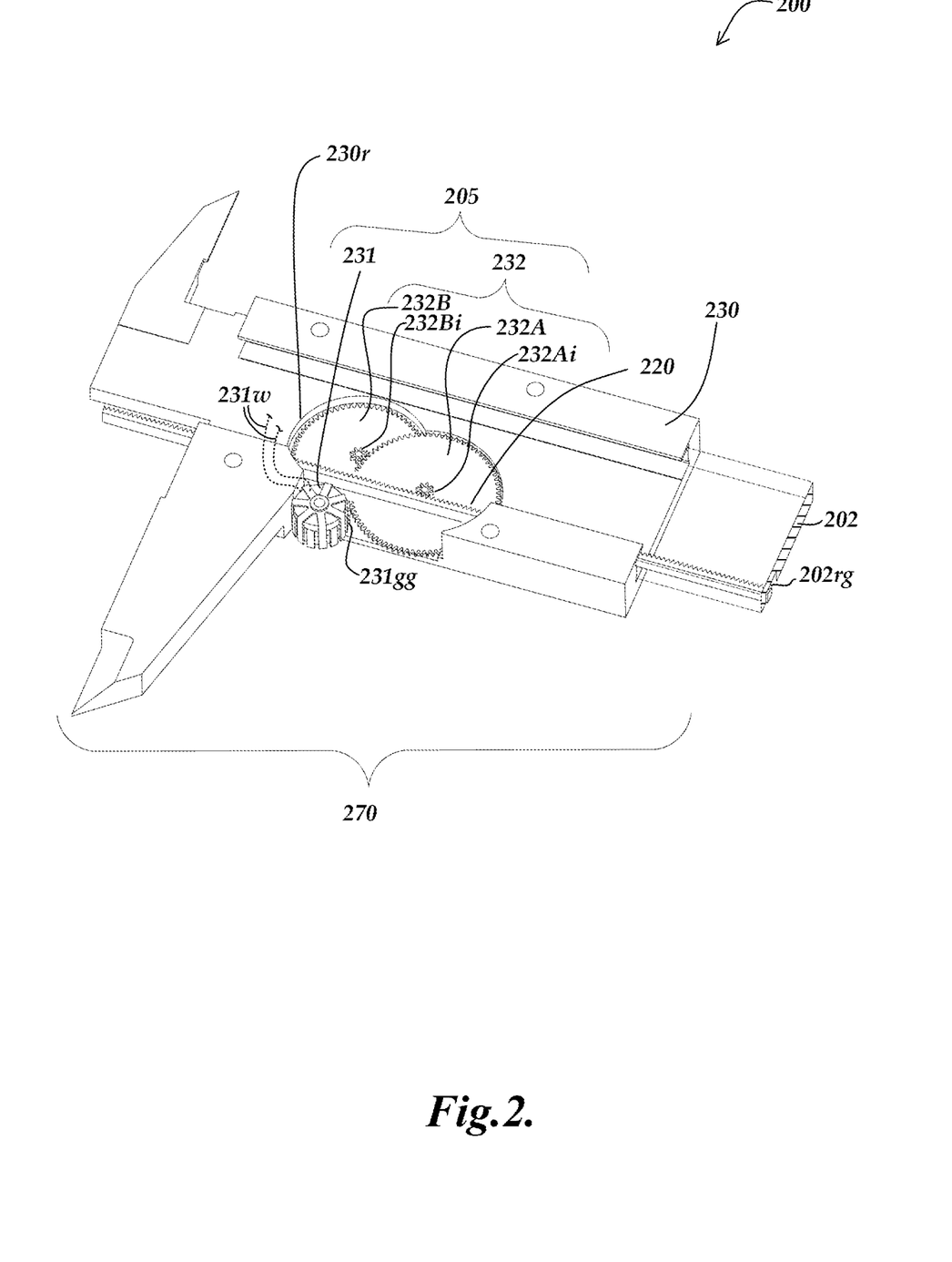
FIG. 2 is a diagram of a first embodiment of power generating arrangement integrated in a caliper.

FIG. 2 is a diagram of a first embodiment of power generating arrangement 205 integrated in a caliper 200. The caliper 200 may be similar to the caliper 100, and therefore only the significant differences are described with respect to FIG. 2. Certain portions of the scale member 202 are omitted from FIG. 2 such that various components of the power generating arrangement 205 may be more clearly illustrated. A rack 220 including gear teeth is attached to, or fabricated as part of, the scale member 202. In the embodiment shown in FIG. 2, the rack 220 is located in a groove 202rg in the underside of a scale 202, and the groove 202rg is large enough to provide clearance for a gear 232Ai (described below) that is driven by with the rack.

As illustrated in FIG. 2, the power generating arrangement 205 is integrated with and moves with the slider 230 (which may be used in the slider assembly 170, shown in FIG. 1). The power generating arrangement 205 comprises a gear assembly 232 and a power generator 231. The gear assembly 232 comprises an input element that is driven from the scale member which, in this embodiment, is the inner gear 232Ai which is driven by the rack 220, and which is joined to or integral with a larger diameter gear 232A. It further comprises an inner gear 232Bi that is driven by the gear 232A, which is joined to or integral with a larger diameter gear 232B. It will be appreciated that the gear tooth speed of the gear 232B is made to be much higher that the speed of the rack 220 by this configuration, such that it is suitable for driving the generator 231 at high RPM when a user moves the scale member 202 and rack 220 of the caliper 200 during a normal motion required for opening and/or closing the caliper to make a measurement.

The gear assembly 232 further comprises a gear 231gg that is joined to an axle of the generator 231, and which is driven by the gear 232B (either directly or through an idler gear, or the like). The various gears of the gear assembly 232 may rotate on axles that are positioned in the slider 230. An axle of the power generator 231 may alternatively be cantilevered off of a suitable portion of the electronic assembly 160 in some embodiments. The slider 230 may include other features (e.g., the recess 230r) as needed to accommodate the power generating arrangement 205, as will be apparent to one of ordinary skill in the art, based on this disclosure.

To summarize, in operation, when a user moves the slider assembly 170 in order to move the jaws 108 and 110 with respect to the jaws 116 and 118 and make a measurement, the slider 230 moves relative to the rack 220, thereby driving the gear assembly 232, which drives the rotating portion of the of the power generator 231 (e.g., a magnetic rotor) to generate power from a normal operating motion of the caliper 200.

The power generator 231 may be similar to the power generators used in commercially available wrist watches. For example, microgenerators available from Kinetron and/or microgenerators disclosed in U.S. Pat. Nos. 5,923,619 and/or 6,124,649, which are hereby incorporated herein in their entirety, may be adapted to the principles disclosed herein. The power generator 231 may have electric leads 231w, shown schematically in dashed outline, which may be connected to the previously outlined power management portion 156.

In the embodiment outlined above, the gear assembly 232 is configured to have an overall gear ratio such that during an expected speed that a user may move the slider 231 during operation, the generator 231 is rotated at a rate that provides relatively efficient power generation (e.g., 1000-10000 RPM). This may be a relatively high gear ratio. However, in various embodiments, it is also desirable that when the power generating arrangement 205 generates power as the user opens or closes the caliper, it contributes a motion resistance force component of at most approximately 20N during the user opening or closing the caliper. The inventor has determined that when this force component exceeds approximately 20N, the combination of normal operating forces (e.g., sliding friction) and this force makes the caliper more difficult and/or tiring to operate repetitively and/or provides an imprecise or less sensitive feel to the user during measurement. Users prefer calipers wherein this resistance force component is at most approximately 20N, finding higher resistance force components undesirable. Users furthermore prefer calipers wherein this resistance force component is at most approximately 10N, rather than 20N.

It will be appreciated that this motion resistance force component is exerted between the scale member and the input element of gear assembly, which in this case is between the rack 220 and the input gear 232Ai. The motion resistance force component may arise primarily due to the inertia of the gear assembly 232 and the generator 231, the magnetic forces arising in the generator 231 (generator work), and friction in the power generating arrangement 205, and is also influenced by the relationships between the radii of the various gears. Thus, in various embodiments, a suitable combination of gear inertia, gear radii, etc., is to be determined (e.g., by analysis and or experiment) based on this disclosure, such that when a user moves the slider assembly 170 relative to the scale member 202 at a maximum expected acceleration and/or speed, the motion resistance force component contributed by the power generating arrangement 205 is at most approximately 20N, or 10N in other embodiments, or less. It will be appreciated that the particular gear configuration illustrated in FIG. 2, and outlined above, is exemplary only and not limiting. For example, a planetary gear arrangement may be used in other embodiments. These and other alternatives will be apparent to one of ordinary skill in the art based on the teachings of this disclosure.

Figures 3A, 3B:
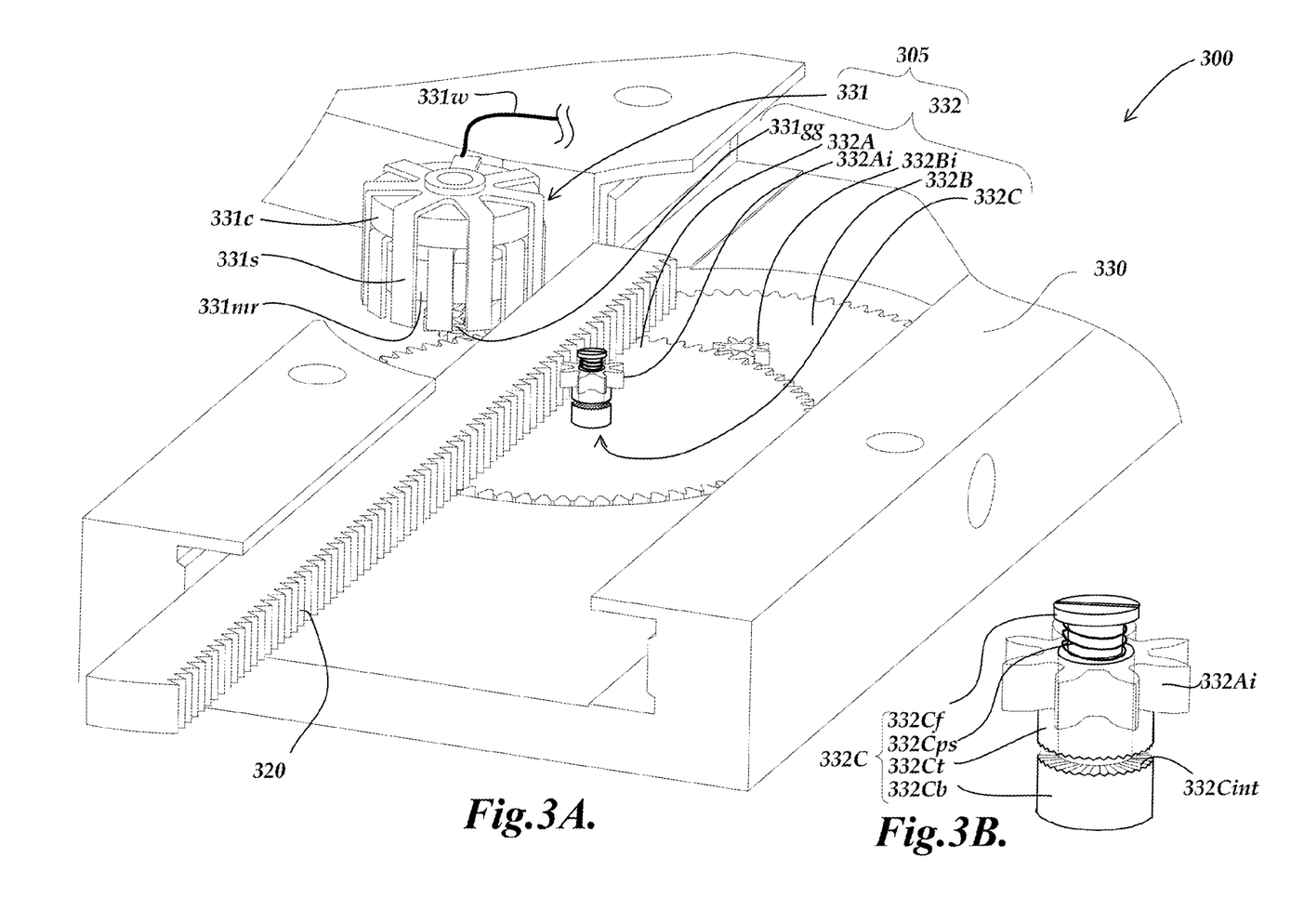
FIGS. 3A and 3B are diagrams of a second embodiment of a power generating arrangement integrated in a caliper.

FIGS. 3A and 3B are diagrams of a second embodiment of a power generating arrangement 305 integrated in a caliper 300. The caliper 300 may be similar to the caliper 200, and the power generating arrangement 305 may be similar to the power generating arrangement 205, and elements numbered 3XX may be similar or analogous to elements 2XX of the caliper 200. Therefore, only the significant differences are described in detail with respect to FIGS. 3A and 3B. In particular, the gear assembly 332 is different than the gear assembly 232 in that it includes a force-limiting clutch 332C, which is shown in FIG. 3A and further magnified in FIG. 3B, described further below.

As previously indicated, it is desirable that when the power generating arrangement 305 generates power as the user opens or closes the calipers, it contributes a motion resistance force component of at most approximately 20N during the user opening or closing the caliper. The inventor has determined that when this force component exceeds approximately 20N, the combination of normal operating forces (e.g., sliding friction) and this force makes the caliper more difficult and/or tiring to operate repetitively and/or provides an imprecise or less sensitive feel to the user during measurement. Users prefer calipers wherein this resistance force component is at most approximately 20N, finding higher resistance force components undesirable. Users furthermore prefer calipers wherein this resistance force component is at most approximately 10N, rather than 20N. Thus, in various embodiments, the force-limiting clutch 332C is configured (e.g., by analysis and or experiment) based on this disclosure, such that when a user manually moves the slider assembly relative to the scale member at a maximum acceleration and/ or speed, or less, the motion resistance force component contributed by the power generating arrangement 305 is at most approximately 20N, or 10N in other embodiments, or less. In other words, if the slider assembly is moved such that the power generating arrangement 305 would contribute a motion resistance force component along the rack 320 that exceeds approximately 20N (or 10N, or less, in some embodiments), then the force-limiting clutch 332C is set such that it slips and/or effectively disengages or decouples at least a portion of the gear assembly 332 (and the generator 331) from the rack 320, to limit the motion resistance force component at the desired level in order to avoid damage or excessive wear of the elements of the gear assembly 332 and the generator 331.

It will be appreciated that this may effectively decouple the drive of the generator 331, sacrificing the power generation in order to absolutely limit the motion resistance force component. However, it will be appreciated that whenever the motion resistance force component falls below the limit determined by the clutch 332C, it effectively reengages or couples the gear assembly 332 (and the generator 331) to the rack 320 and again generates power.

Furthermore, the presence of the clutch allows desirable design tradeoffs. For example, in some such embodiments, in contrast to the power generating arrangement 205 which had no clutch, it is not necessary to configure the overall gear ratio of the power generating arrangement 305 to limit its motion resistance force component, because the clutch provides that limit. Rather, it may have a larger desirable gear ratio such that lower slider speeds provide higher generator RPM, to advantageously generate more power at lower slider speeds, for example. Since the gear ratio need not be conservatively limited, this may actually produce a net gain in generated power relative to the power generating arrangement 205, for the most typical caliper operating motions.

One simplified embodiment of a force-limiting clutch 332C is shown magnified in FIG. 3B. The clutch 332C includes a top clutch element 332Ct that is joined to the inner gear 332Ai, and a bottom clutch element 332Cb that is joined to the outer gear 332B. Mating ridged surfaces of these elements meet at the clutch interface 332Cint. The elements are illustrated with a separation at the interface, but this is for purposes of illustration only. In operation, the elements are biased to mate against one another under the force of the clutch preload spring 332Cps, which is compressed against the inner gear 332Ai by the fastener 332Cf. The fastener 332Cf screws into an axle (shown in dashed outline) that is joined to the bottom clutch element 332Cb and/or the outer gear 332A.

Under normal operation, the clutch preload spring 332Cps forces the top clutch element 332Ct to slide down along the axle such that the mating ridges of the clutch elements mesh at the clutch interface 332Cint, such that torque is transmitted at the interface and the inner gear 332Ai drives the outer gear 332A. The clutch preload spring is designed and/or adjusted (e.g., by adjusting the fastener 332Cf) such that when the force of the rack on the inner gear 332Ai exceeds the desired motion resistance force component, the force/torque on the mating ridges at the clutch interface 332Cint causes the top clutch element 332Ct to slip up and over the ridges of the lower clutch elements 332Cb, which effectively disengages the inner gear 332Ai from the outer gear 332A, allowing the inner gear 332Ai to rotate more freely and reduce its reaction force component on the rack 320 to the desired level.

It will be appreciated that the particular simplified clutch configuration illustrated in FIGS. 3A and 3B, and outlined above, is exemplary only and not limiting. For example, planar friction plates may be used instead of ridged elements, and/or conical or cylindrical elements may form the clutch interface, and/or bearings or other additional elements may be added to reduce wear at various bearing points, and/or the diameter of clutch elements and various other elements may be altered, or the clutch may be oriented in a different plane using suitably adapted gears, and so on. These and other alternatives will be apparent to one of ordinary skill in the art based on the teachings of this disclosure.

FIG. 3A also shows additional details of one embodiment of a power generator 331. The generator 331 may comprise a coil 331c, a stator 331s, a magnetic rotor 331mr, driven by a gear 331gg (including and idler gear, in this embodiment). The magnetic rotor 331mr is attached to an axle (not shown) which is attached to the gear 331gg. In some embodiments, the magnetic rotor 331mr may be a multi-pole SmCo alloy magnet such as that described in U.S. Pat. No. 5,229,738. The outer gear 332B rotates the gear(s) 331gg thereby causing the magnetic rotor 331mr to rotate with respect to the coil 331c which thereby generates energy that may be transmitted as AC power to the power management portion 156 through a wire connection 331w, which may be connected to the adjacent signal processing and display circuit board 150 (e.g., the circuit board 150).

It should be appreciated that while the elements of the power generating arrangement 305 of the caliper 300 are shown in a similar configuration to that of the caliper 200, embodiments of such elements may be adapted to any suitable caliper configuration, as will be understood by one of ordinary skill in the art based on the teachings of this disclosure.

Figure 4A:
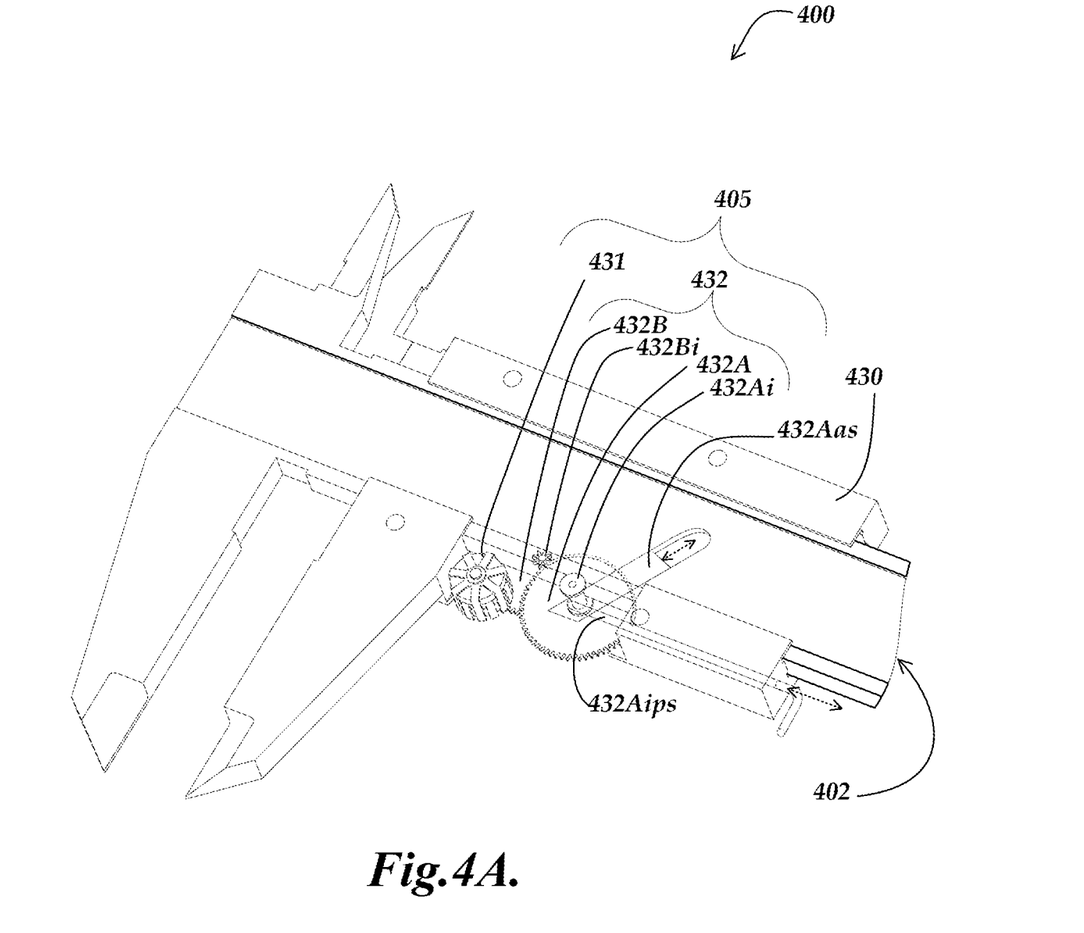
FIGS. 4A and 4B are diagrams illustrating a portion of a third embodiment of a power generating arrangement integrated in a caliper.
Figure 4B:
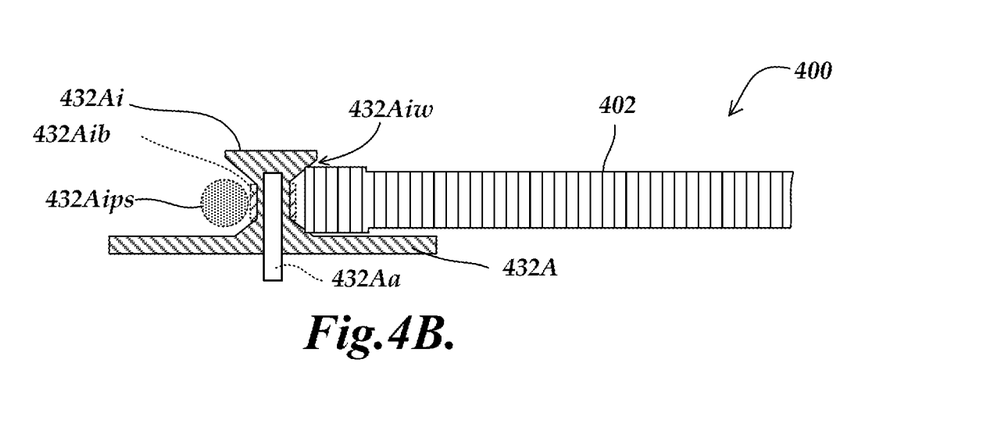

FIGS. 4A and 4B are diagrams illustrating a portion of a third embodiment of a power generating arrangement 405 integrated in a caliper 400. The caliper 400 may be similar to the caliper 200 or 300, and the power generating arrangement 405 may be similar to the power generating arrangement 205 or 305, and elements numbered 4XX may be similar or analogous to elements 2XX of the caliper 200 or 3XX of the caliper 300. Therefore, only the significant differences are described with respect to FIGS. 4A and 4B. In particular, the gear assembly 432 is different than the gear assemblies 232 and 332 in that the input element that provides the function of the previously described input gear (e.g., the gear 232Ai or 332Ai) is a friction roller 432Ai that may be joined to an outer gear 432A. The friction roller 432Ai engages an edge of the scale member 402 through friction, and is thereby rotated to drive the outer gear 432A. Thus, in comparison to the calipers 200 and 300, the rack (e.g., the rack 220 or 320) and the associated groove in the scale member may be eliminated.

It will be understood that the gear assembly 432 may otherwise be similar or analogous to the gear assembly 232 or 332, and that the slider 430 may be similar to the slider 230 or 330, except the locations of various gears, axles, holes, and recesses may be adjusted to accommodate the configuration of the friction roller. In one embodiment, the friction roller 432Ai and outer gear 432A may be mounted to rotate on an axle 432Aa (shown in FIG. 4B) supported in the slider 430.

In the illustrated embodiment, the axle 432Aa may be mounted in an axle support 432Aas that may slide a short distance in a matching groove in the slider 430, which provides a degree of freedom for the position of the friction roller 432Ai, such that its friction pressure against scale member 402 may be applied or released by engaging or disengaging a pressure spring 432Aips against a rotating bearing 432Aib on the friction roller 432Ai, as will be understood by examination of FIGS. 4A and 4B.

In the embodiment shown in FIG. 4B, the friction roller 432Ai comprises a wedge-shaped recess 432Aiw which causes an increased friction pressure against the scale member 402, for given force from the pressure spring 432Aips. A similar wedge-shaped recess roller may be found in commonly assigned U.S. Pat. No. 7,533,474, which is hereby incorporated by reference in its entirety.

In one embodiment, the pressure spring 432Aips may be moved by a user (e.g., as indicated by the double-headed arrow in FIG. 4A), through a button or slide that extends from the pressure spring 432Aips to or through the cover (e.g., the cover 140). When the pressure spring 432Aips is actuated in the direction toward the friction roller 432Ai, its alignment is such that it is deflected by the friction roller 432Ai and exerts a force on it such that the friction roller 432Ai engages the scale member 402 with a high friction pressure. When the pressure spring 432Aips is withdrawn in the direction away from the friction roller 432Ai, it exerts no force on it, such that the friction roller 432Ai disengages with substantially no friction pressure on the scale member 402. This allows a user to toggle between an "active" or "inactive" power generation state.

FIG. 4A and FIG. 4B show an "active" state. The "inactive" state may be advantageous at some times in that it decreases the amount of resistance to motion of the slider assembly. The caliper 400 may be switched from an "active" to an "inactive" state when a user does not require more power to be stored to power the caliper 400. The state may be toggled by a user input, or in some embodiments, the state may be automatically toggled when the caliper 400 has a sufficient level of power stored.

It should be appreciated that the toggling capability outlined above is optional. In some embodiments, the pressure spring 432Aips is fixed in position such that the friction roller 432Ai is always engaged. In some embodiments where sufficiently tight assembly tolerances may be maintained, the pressure spring 432Aips and the sliding axle support 432Aas may be omitted and the axle 432Aa may be mounted directly in the slider 430 at a position that creates a desirable friction force between the friction roller 432Ai and the scale member 402. It will be appreciated that the particular simplified pressure spring configuration illustrated in FIGS. 4A and 4B, and outlined above, is exemplary only and not limiting. Also, a force-limiting clutch may be implemented in the gear assembly 432 if desired (e.g., between the gear 432Bi and the outer gear 432B, in one embodiment). These and other alternatives will be apparent to one of ordinary skill in the art based on the teachings of this disclosure.

Figure 5:
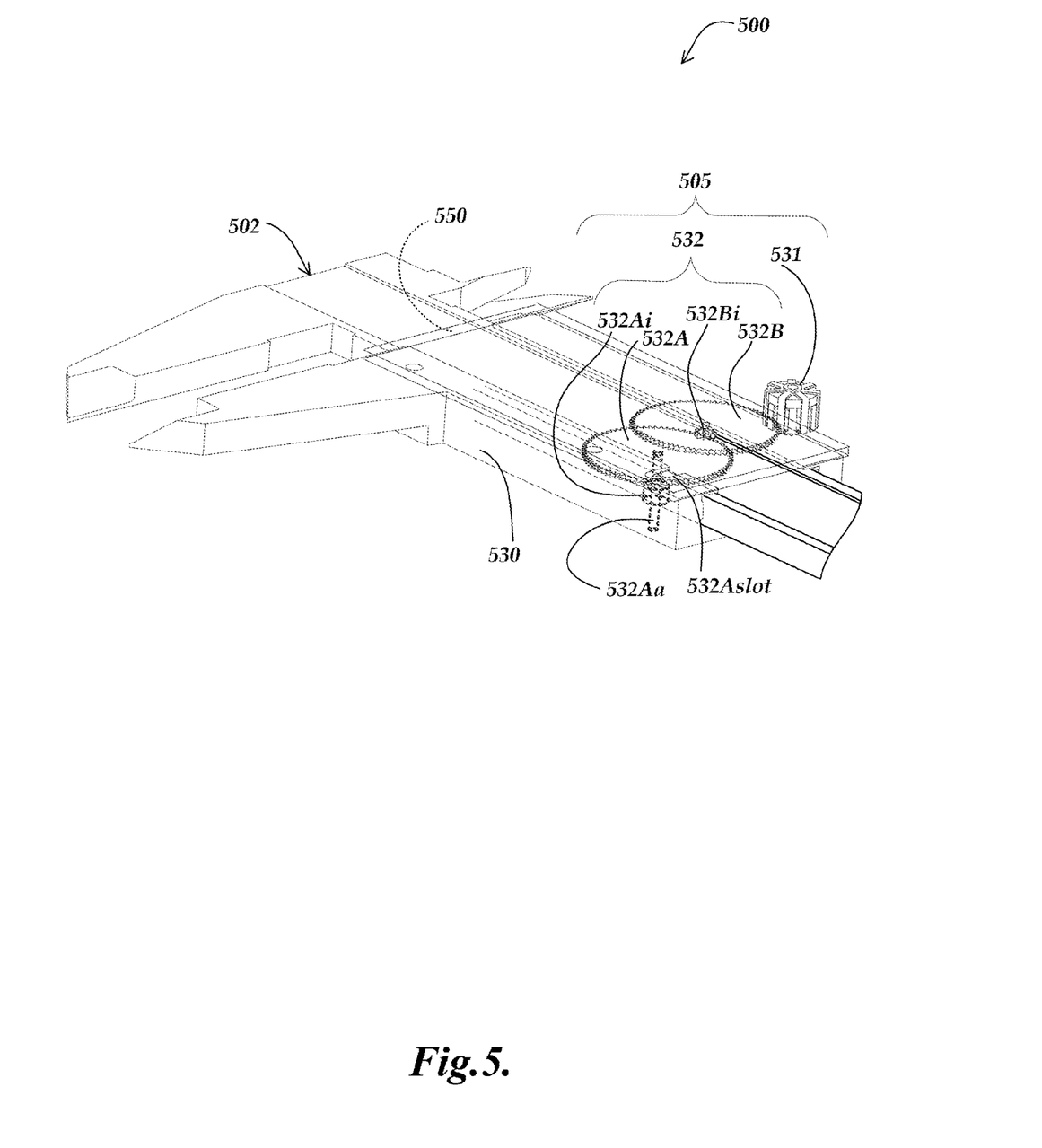
FIG. 5 is a diagram illustrating a portion of a fourth embodiment of a power generating arrangement integrated in a caliper.

FIG. 5 is a diagram illustrating a portion of a fourth embodiment of a power generating arrangement 505 integrated in a caliper 500. The caliper 500 may be similar to the caliper 200 or 300, the power generating arrangement 505 may be similar to the power generating arrangement 205 or 305, and elements numbered 5XX may be similar or analogous to elements 2XX of the caliper 200 or 3XX of the caliper 300. Therefore, only the significant differences are described with respect to FIG. 5.

In particular, the gear assembly 505 is different than the gear assemblies 232 and 332 in that at least some gears of the gear assembly 505 are located in a volume between the top of the scale member 502 and the inside of a cover that encloses the signal processing portion (e.g., the cover 140, shown in FIG. 1). In addition, the input element that provides the function of the previously described input gear (e.g., the gear 232Ai or 332Ai) is a friction roller 532Ai that may be joined to an outer gear 532A. The friction roller 532Ai may be similar or analogous to the friction roller 432Ai outlined previously, and engages an edge of the scale member 502 through friction, and is thereby rotated to drive the outer gear 532A. Additionally, the friction roller 532Ai may also provide a force-limiting function in a manner analogous to the clutch 332C.

In the illustrated embodiment, the axle 532Aa may include bearings that are captured in an axle support slot 532A slot such that it has a degree of freedom toward the scale member 502, and may be biased against the edge of the scale member 502 by a pressure spring (not shown) to provide a desired friction pressure, as will be understood by examination of FIG. 5. The friction roller 532Ai may comprise a polymer sleeve or coating that has a high friction coefficient and presses against scale member 502.

As indicated above, at least some gears of the gear assembly 505 are located in a volume between the top of the scale member 502 and the inside of a cover that encloses the signal processing portion. In the illustrated embodiment, it may be seen that the gears 532A, 532Bi, and 532B, as well as the generator 531, are located in this volume, which may have advantages such as economical assembly, for example. In this particular embodiment, the gears and generator are between the circuit board 550 (shown in dashed outline) and the cover. The axles for the gear 532B and the generator 531 may be mounted in or on the circuit board 550 (e.g., in inserts, or on an assembly frame that is mounted to the circuit board 550). The axles and or mounting frame may be configured to provide clearance for the various electronic components relative to the gears and generator.

It will be understood that the gear assembly 532 may otherwise be similar or analogous to the gear assembly 232 or 332, and that the caliper 500 may be similar to the caliper 200 or 300, except the locations of various circuit elements, gears, axles, holes, and recesses may be adjusted as outlined above. A force-limiting clutch may be implemented in the gear assembly 532 if desired (e.g., between the friction roller 532Ai and the outer gear 532A, in one embodiment). These and other alternatives will be apparent to one of ordinary skill in the art based on the teachings of this disclosure.

While various embodiments of the invention have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property of privilege is claimed are defined as follows:

1. An electrically powered caliper configured to generate power for measurement operations, the caliper comprising:
    a scale member;
    a slider;
    a signal processing portion configured to measure a displacement between the scale member and the slider; and
    a power generating arrangement fixed relative to the slider, comprising:
        a gear assembly configured to rotate in response to a force provided through the scale member to the gear assembly by a user opening or closing the caliper; and
        a power generator coupled to the gear assembly and configured to rotate in response to force provided by the rotating gear assembly and provide power to the signal processing portion,
    wherein:
        the power generating arrangement generates power as the user opens or closes the caliper; and
        the power generating arrangement is configured such that it contributes a motion resistance force component of at most 20N during the user opening or closing the caliper using a maximum manual acceleration.

2. The caliper of claim 1, wherein the power generating arrangement is configured such that it contributes a motion resistance force component of at most 20N during the user opening or closing the caliper using a maximum manual speed.

3. The caliper of claim 2, wherein the power generating arrangement is configured such that it contributes a motion resistance force component of at most 10N.

4. The caliper of claim 2, wherein the gear assembly comprises a force-limiting clutch which is configured to limit the motion resistance force component.

5. The caliper of claim 4, wherein the gear assembly comprises an input element that is driven by the force provided through the scale member and the force-limiting clutch is located between the input element and a gear coupled to the input element by the force-limiting clutch.

6. The caliper of claim 4, wherein the force-limiting clutch is configured to limit the motion resistance force component to at most 10N.

7. The caliper of claim 1, wherein the signal processing portion comprises an energy storage element comprising at least one of a battery and a capacitor configured to store energy generated by the power generating arrangement.

8. The caliper of claim 1, wherein the gear assembly comprises an input element that is driven by the force provided through the scale member, and the input element comprises one of a gear and a friction roller.

9. The caliper of claim 8, wherein the input element comprises a gear that is driven by a rack attached to the scale member.

10. The caliper of claim 8, wherein the input element comprises a friction roller that is driven by an edge of the scale member.

11. The caliper of claim 10, wherein the caliper further comprises a spring element that presses the friction roller against the scale member.

12. The caliper of claim 11, wherein the spring element is movable by a user and is configured to press the friction roller against the edge of the scale member in a first position corresponding to an active power generation state, and to not press the friction roller against the edge of the scale member in a second position corresponding to an inactive state when power generation is not intended.

13. The caliper of claim 1, wherein the gear assembly comprises an input element of a smaller diameter that is coupled to an outer gear of a larger diameter that drives an inner gear of a smaller diameter that is coupled to another outer gear of a larger diameter that drives the power generator through at least one additional gear.

14. The caliper of claim 1, wherein at least some gears of the power generating arrangement are located in a volume between the top of the scale member and the inside of a cover that encloses the signal processing portion.

15. The caliper of claim 1, wherein at least some gears of the power generating arrangement are located in a volume between the bottom of the scale member and an inside surface of a portion of the slider that wraps around the bottom of the scale member.

* * * * *